US010294883B2

(12) United States Patent
Krengel et al.

(10) Patent No.: US 10,294,883 B2
(45) Date of Patent: May 21, 2019

(54) SYSTEM AND METHODS FOR CONTROLLING AIR FUEL RATIO

(71) Applicant: Ford Global Technologies, LLC, Dearborn, MI (US)

(72) Inventors: Eric Krengel, Moreland Hills, OH (US); Steven Schwochert, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/633,457

(22) Filed: Jun. 26, 2017

(65) Prior Publication Data

US 2017/0292465 A1 Oct. 12, 2017

Related U.S. Application Data

(62) Division of application No. 13/168,124, filed on Jun. 24, 2011, now Pat. No. 9,695,731.

(51) Int. Cl.

| | |
|---|---|
| ***F01N 3/00*** | (2006.01) |
| ***F02D 41/14*** | (2006.01) |
| ***F02D 41/24*** | (2006.01) |
| ***F01N 11/00*** | (2006.01) |
| ***F02D 41/30*** | (2006.01) |

(52) U.S. Cl.

CPC .......... *F02D 41/1454* (2013.01); *F01N 11/00* (2013.01); *F01N 11/007* (2013.01); *F02D 41/1441* (2013.01); *F02D 41/1456* (2013.01); *F02D 41/2441* (2013.01); *F02D 41/2454* (2013.01); *F02D 41/30* (2013.01); *Y02T 10/47* (2013.01)

(58) Field of Classification Search

CPC .......................... F01N 11/007; F02D 41/2454

See application file for complete search history.

(56) References Cited

U.S. PATENT DOCUMENTS

| | | | |
|---|---|---|---|
| 5,359,852 | A | 11/1994 | Curran et al. |
| 5,392,598 | A | 2/1995 | White et al. |
| 5,778,663 | A | 7/1998 | Kostka |

(Continued)

OTHER PUBLICATIONS

Buglass, J. et al., "Interactions Between Exhaust Gas Composition and Oxygen Sensor Performance," SAE Technical Paper Series No. 982646, International Fall Fuels and Lubricants Meeting and Exposition, Oct. 19, 1998, San Francisco, California, 13 pages.

(Continued)

*Primary Examiner* — Patrick D Maines

(74) *Attorney, Agent, or Firm* — Julia Voutyras; McCoy Russell LLP

(57) ABSTRACT

Methods and system for controlling air-fuel ratios in an internal combustion engine are disclosed. One embodiment comprises, adjusting a sensor calibration correction value of an exhaust sensor upstream of a catalyst based on an exhaust sensor downstream of the catalyst. The adjustment of the sensor calibration correction value takes advantage of the fact that certain aromatic hydrocarbons causing errors in the reading of the upstream sensor are not present at the downstream sensor due to sufficient catalytic activity of a catalyst positioned between the sensors.

11 Claims, 6 Drawing Sheets

(56) References Cited

U.S. PATENT DOCUMENTS

| | | | | |
|---|---|---|---|---|
| 5,802,844 | A * | 9/1998 | Lee | F01N 3/2033 60/274 |
| 7,104,047 | B2 | 9/2006 | Takubo | |
| 7,559,193 | B2 | 7/2009 | Iihoshi et al. | |
| 8,489,270 | B2 | 7/2013 | Wehmeier et al. | |
| 2004/0060550 | A1 | 4/2004 | Wu | |
| 2006/0288967 | A1 | 12/2006 | Joyce et al. | |
| 2007/0089398 | A1* | 4/2007 | Fujiwara | F01N 11/007 60/277 |
| 2008/0262704 | A1 | 10/2008 | Kawase et al. | |
| 2009/0260347 | A1 | 10/2009 | Iwazaki et al. | |
| 2010/0175370 | A1 | 7/2010 | Bunge | |
| 2010/0180874 | A1* | 7/2010 | Iwahashi | F01L 13/0021 123/674 |
| 2010/0223907 | A1* | 9/2010 | Walde | F01N 3/2066 60/274 |
| 2011/0173962 | A1 | 7/2011 | Miwa et al. | |
| 2012/0290192 | A1 | 11/2012 | Okazaki et al. | |

OTHER PUBLICATIONS

Anonymous, “Decrease Thermal Exposure While Shorten DeSOx Time During LNT DeSOx,” IPCOM No. 000125179, Published May 23, 2005, 3 pages.

Anonymous, “In-situ Oxygen Concentration Measurement in the Catalyst Layer and underneath of the Catalyst Layer of the PEMFC,” IPCOM No. 000216973, Published Apr. 26, 2012, 3 pages.

* cited by examiner

SYSTEM AND METHODS FOR CONTROLLING AIR FUEL RATIO

CROSS REFERENCE TO RELATED APPLICATION

The present application is a divisional of U.S. patent application Ser. No. 13/168,124, entitled "SYSTEM AND METHODS FOR CONTROLLING AIR FUEL RATIO," filed on Jun. 24, 2011. The entire contents of the above-referenced application are hereby incorporated by reference in its entirety for all purposes.

FIELD

The present disclosure relates to systems and methods for controlling air-fuel ratio in an internal combustion engine.

BACKGROUND AND SUMMARY

Determination of engine air-fuel ratios may be made by one or more oxygen sensors located in the exhaust stream of the engine, and fuel injection amounts to the cylinders can be adjusted in response to the determined air-fuel ratio. However, the exhaust may contain multiple constituents, such as CO, $H_2$, and unburnt hydrocarbons, and some of these constituents can bias the reading of the oxygen sensors. For example, aromatic hydrocarbons present in the exhaust, such as toluene, are known to bias oxygen sensors rich, interfering with accurate determination of the air-fuel ratio. Traditional solutions to account for aromatic hydrocarbons in the exhaust have included a lambda offset, whereby the calculated air-fuel ratio may be adjusted based on estimated aromatic hydrocarbon amounts as determined by engine speed, load, and cam position.

The inventors herein have identified a potential issue with the above approach. The amount of cyclic hydrocarbons produced by an engine may vary based on engine temperature. Further, the above approach does not factor in power-train to power-train variabilities and fuel differences among vehicles.

Thus, in one example, the above issue may be at least partially addressed by an engine exhaust system method. The method comprises adjusting a sensor calibration correction value of an exhaust sensor upstream of a catalyst based on an exhaust sensor downstream of the catalyst in response to steady-state conditions with engine temperature below a threshold while catalyst activity is above a threshold.

For example, the engine may be operating below normal operating temperature. As such, additional aromatic hydrocarbons may be present in the exhaust upstream of the catalyst, which can result in a biased sensor reading. If the catalyst is active, the hydrocarbons present in the exhaust stream will be oxidized in the catalyst. Thus, the sensor reading downstream of the catalyst is less likely to be biased by the presence of aromatic hydrocarbons. By adjusting a sensor calibration correction value of the upstream sensor based on the downstream sensor reading under conditions where both sensors should be reading the same oxygen level (or the same air-fuel ratio), the bias of the upstream sensor reading by the aromatic hydrocarbons may be identified, and used to provide accurate determination of the air-fuel ratio by the upstream sensor, even under cold engine operating conditions, thus improving fuel economy and decreasing emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Accurate determination of an amount of oxygen in an exhaust stream of an engine may be hindered in the presence of certain exhaust gas constituents, particularly aromatic hydrocarbons such as toluene. For example, such hydrocarbons mostly cause inaccurate readings of exhaust oxygen (air-fuel ratio) sensors in engine out gasses (upstream of any catalytic converters in the exhaust). In particular, the catalytic converters, when active, typically convert such hydrocarbons, and as such any downstream sensors are typically unaffected.

To account for the effect of these aromatic hydrocarbons, upstream air-fuel ratio sensor readings may be corrected. The correction may include mapped engine data based on speed and load, for example, that attempts to account for the amount of aromatic hydrocarbons typical of the current operating conditions. Further, real-time updates to the sensor correction can be learned, under selected operation conditions, from the downstream sensor readings. For example, under conditions where both upstream and downstream sensors should read the same air-fuel ratio (e.g., where both sensors are actually measuring exhaust gasses with the same, or substantially the same, actual air-fuel ratio), any differences in the reading may be an indication of the effects of aromatic hydrocarbons—because the upstream sensor is being affected by the aromatic hydrocarbons, yet the downstream sensor is not being affected by the aromatic hydrocarbons (because of the active catalyst therebetween).

As such, in one example, the calibration, or sensor reading, of the upstream air-fuel ratio may be adapted in real-time based on a difference between an oxygen sensor reading upstream of a catalyst and an oxygen sensor switch point downstream of the catalyst under conditions where both sensors should otherwise be indicating the same reading. Such information can then be mapped to the current operating conditions, and used during future operation to obtain more accurate air-fuel ratio readings from the upstream sensor.

Figure 1:
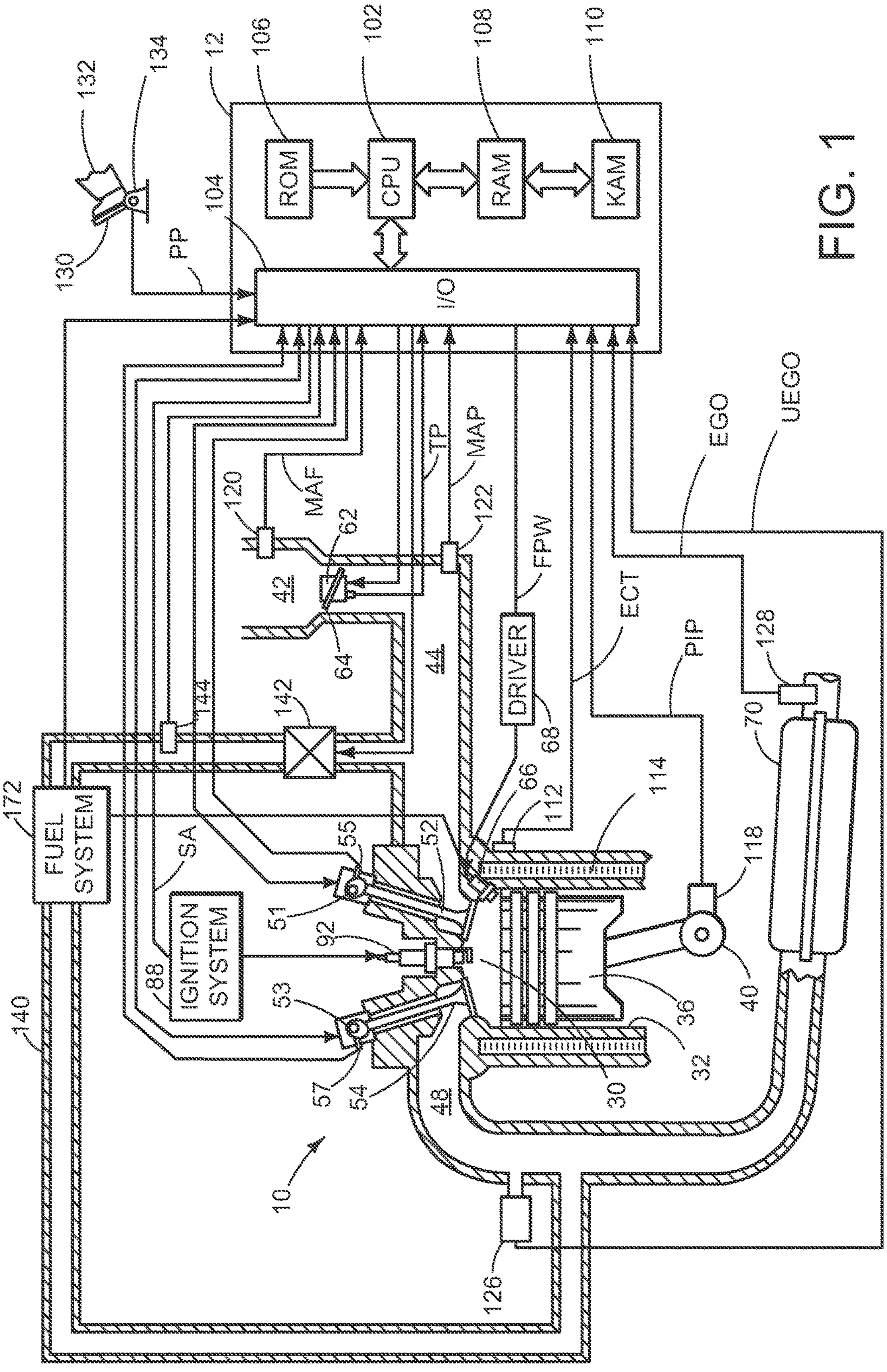
FIG. 1 shows a schematic diagram of an engine including an exhaust system and exhaust gas sensors.
Figure 2:
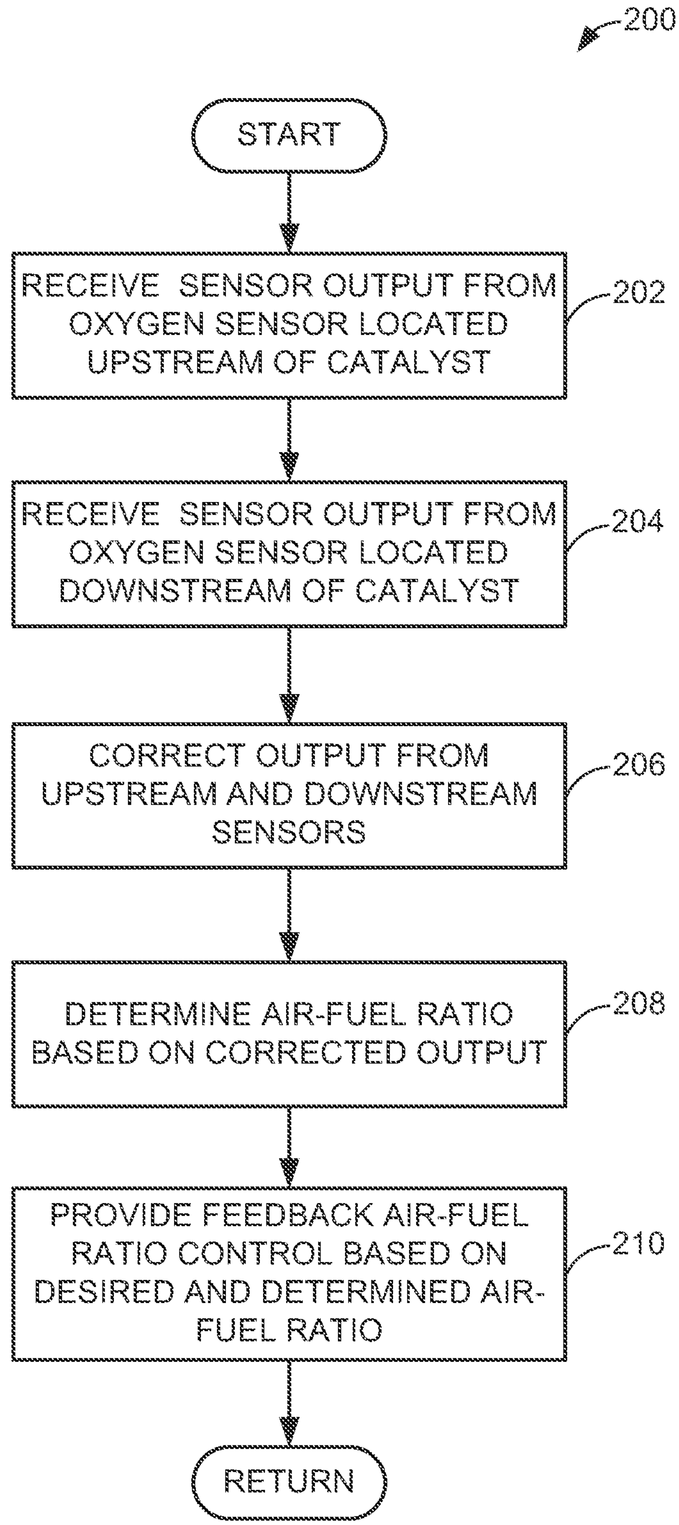
FIG. 2 is a flow diagram illustrating a method for determining an air-fuel ratio for use in adjusting a fuel injection amount according to an embodiment of the present disclosure.
Figure 3:
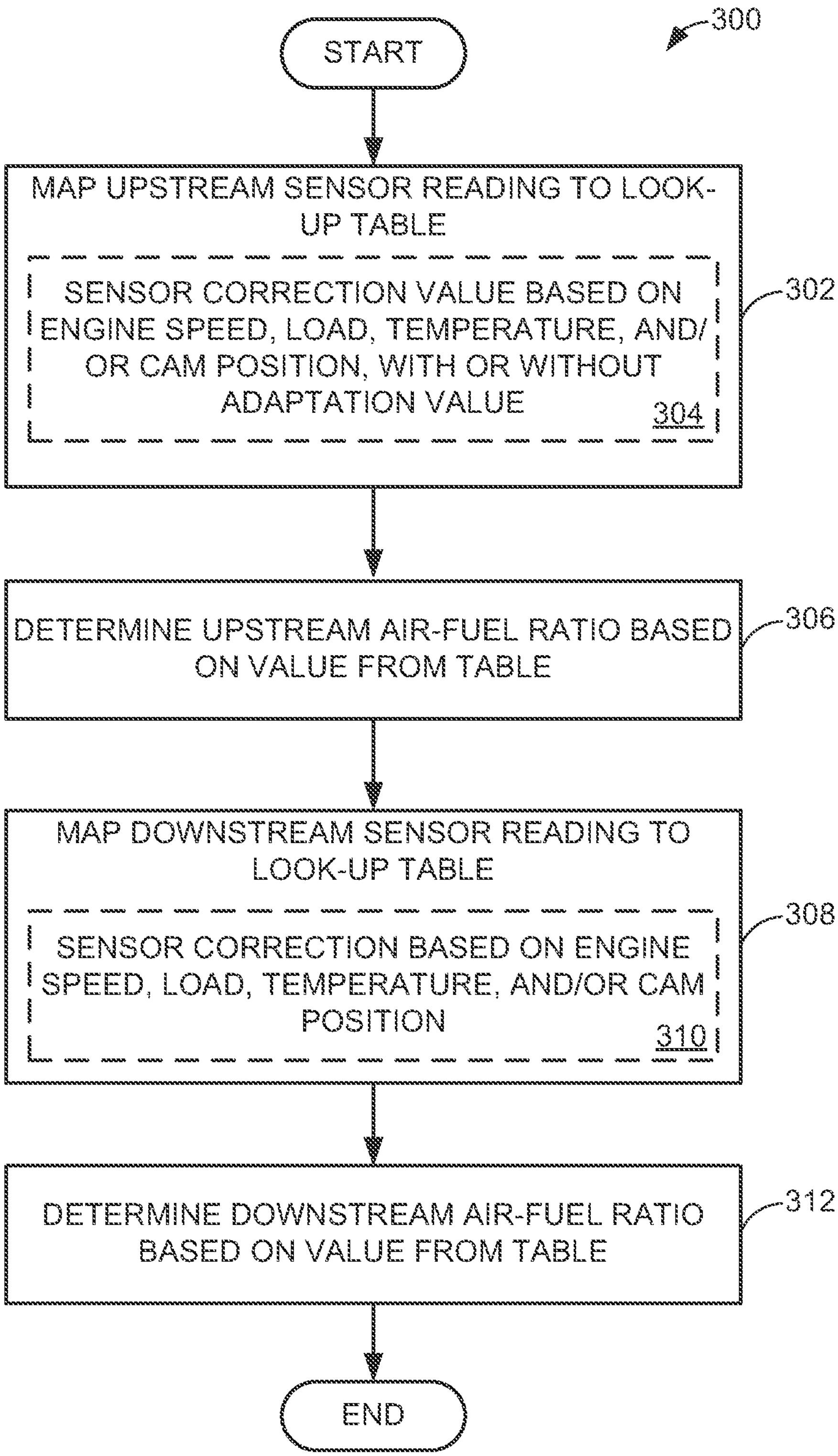
FIG. 3 is a flow diagram illustrating an embodiment of a method of modifying air-fuel ratios based on engine operating conditions according to the disclosure.
Figure 4:
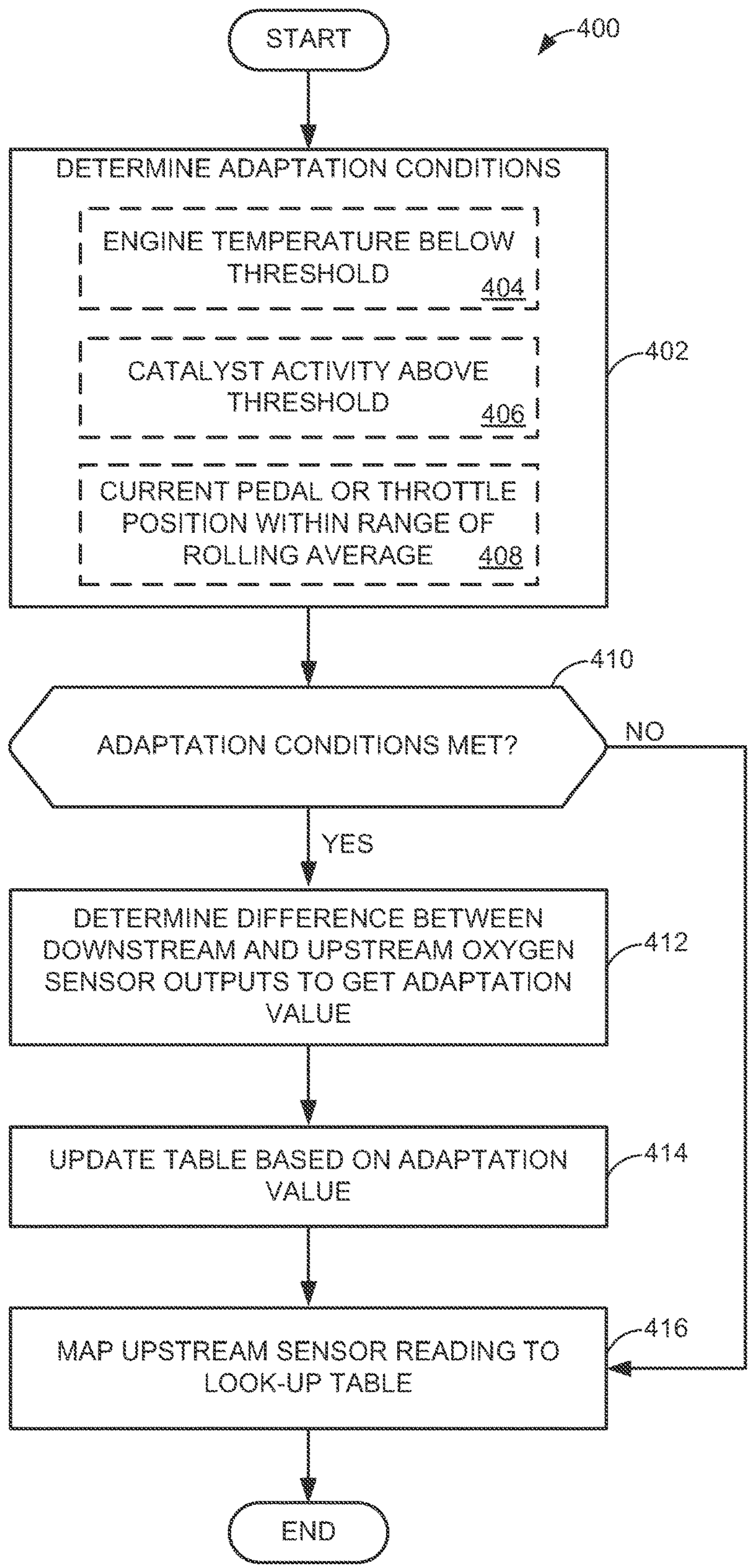
FIG. 4 is a flow diagram illustrating a method of determining an adaptation value according to an embodiment of the present disclosure.
Figure 5:
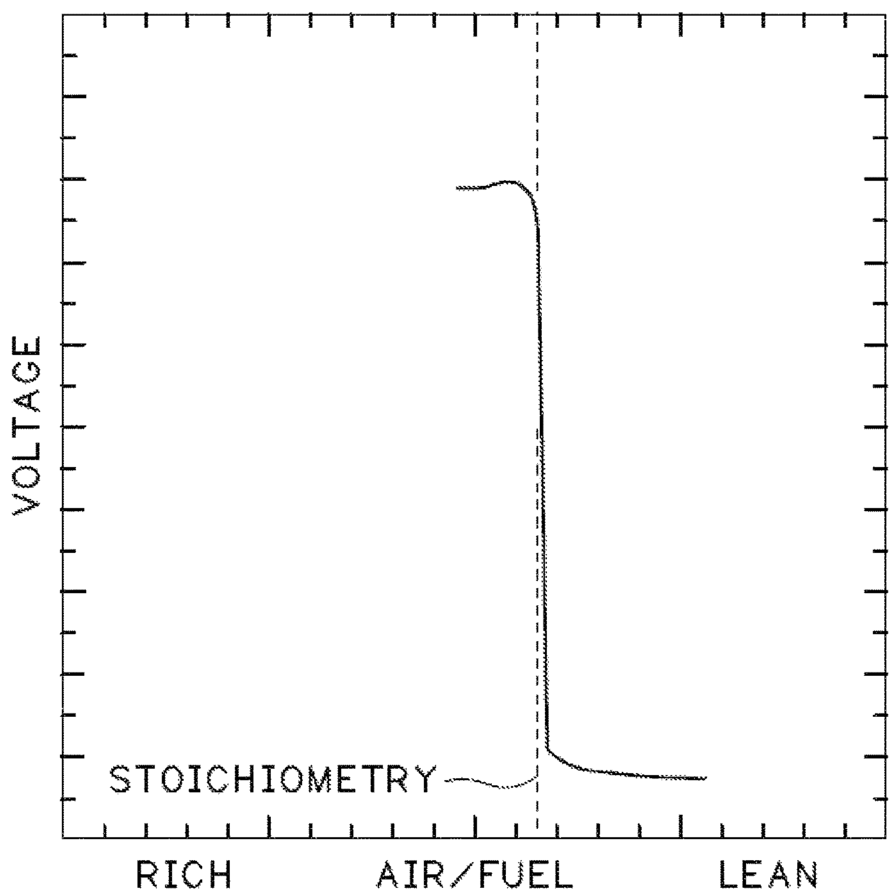
FIG. 5 shows an exemplary switch point from a narrow-band oxygen sensor.
Figure 6:
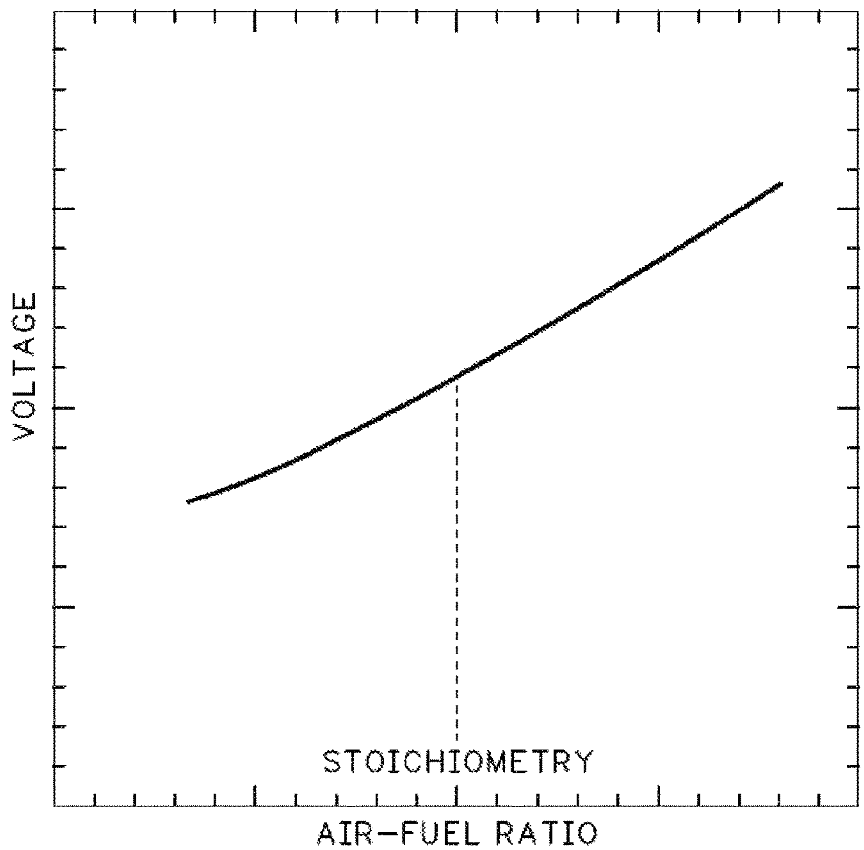
FIG. 6 shows an exemplary output signal from a wide-band oxygen sensor.

FIG. 1 shows an engine and exhaust system illustrating upstream and downstream sensors that may be corrected as explained above. FIGS. 2-4 show methods that may be carried out by a controller for correcting air-fuel ratio readings to account for aromatic hydrocarbons based on various engine operating parameters. FIGS. 5 and 6 show example oxygen sensor characteristics of the upstream and downstream sensor, respectively.

Referring now to FIG. 1, a schematic diagram showing one cylinder of multi-cylinder engine 10, which may be included in a propulsion system of an automobile, is illustrated. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves. In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66, which is supplied fuel from fuel system 172. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate embodiment, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

An upstream exhaust gas sensor 126 is shown coupled to exhaust passage 48 upstream of emission control device 70. Upstream sensor 126 may be any suitable sensor for providing an indication of exhaust gas air-fuel ratio such as a linear wideband oxygen sensor or UEGO (universal or wide-range exhaust gas oxygen), a two-state narrowband oxygen sensor or EGO, a HEGO (heated EGO), a $NO_x$, HC, or CO sensor. In one embodiment, upstream exhaust gas sensor 126 is a UEGO configured to provide output, such as a voltage signal, that is proportional to the amount of oxygen present in the exhaust. Controller 12 uses the output to determine the exhaust gas air-fuel ratio. The output may be used to determine the air-fuel ratio, or it may be adapted based on one or more engine operating parameters, as will be explained in more detail with reference to FIGS. 2-4 below.

Emission control device 70 is shown arranged along exhaust passage 48 downstream of exhaust gas sensor 126. Device 70 may be a three way catalyst (TWC), configured to reduce NOx and oxidize CO and unburnt hydrocarbons. In some embodiments, device 70 may be a $NO_x$ trap, various other emission control devices, or combinations thereof.

A second, downstream exhaust gas sensor 128 is shown coupled to exhaust passage 48 downstream of emissions control device 70. Downstream sensor 128 may be any suitable sensor for providing an indication of exhaust gas air-fuel ratio such as a UEGO, EGO, HEGO, etc. In one embodiment, downstream sensor 128 is an EGO configured to indicate the relative enrichment or enleanment of the exhaust gas after passing through the catalyst. As such, the EGO may provide output in the form of a switch point, or the voltage signal at the point at which the exhaust gas switches from lean to rich.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP.

Storage medium read-only memory 106 can be programmed with computer readable data representing non-transitory instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Turning now to FIG. 2, a method 200 for controlling air-fuel ratio is depicted. Method 200 may be carried out by a controller of an engine, such as controller 12, and comprises calculating an air-fuel ratio from oxygen sensors located in the exhaust stream. At 202, method 200 comprises receiving output from an oxygen sensor upstream of a catalyst. The upstream oxygen sensor may be a UEGO positioned upstream of a catalyst and configured to provide a linear voltage output over a wide range of air-fuel ratios. An example sensor output signal from a UEGO showing readings in a linear range around stoichiometry can be seen in FIG. 6.

At 204, method 200 comprises receiving output from an oxygen sensor downstream of the catalyst. The downstream oxygen sensor may be an EGO positioned downstream of the catalyst and configured to provide a reading of a relative rich or lean air-fuel ratio based on output in the form of a switch point, or the voltage signal at the point at which the exhaust gas switches from lean to rich. An example sensor EGO switch point at stoichiometry can be seen in FIG. 5. The sensor output at 202 and 204 may be received by the controller concurrently, or it may be received sequentially.

The output from the upstream and downstream sensors may be corrected at 206. As explained above, aromatic hydrocarbons may be generated to a greater or less extent depending on operating conditions, such as speed, load, cam timing, etc. As such, predetermined stored data may be provided, in tables, for correcting each of the sensor readings at the current operating conditions, as described further with regard to FIG. 3. For example, a calibration correction value may be determined that corrects the conversion from the voltage output of each of the exhaust sensors to respective measured air-fuel ratios. Corrected air-fuel ratios are determined at 208 based on the corrected upstream and downstream sensor outputs. The corrected air-fuel ratios may then be used for feedback air-fuel ratio control, based on a desired air-fuel ratio, using proportional or other feedback control at 210. The desired air-fuel ratio may be based on various operating conditions, such as speed, load, engine emissions, combustion stability, etc. Such feedback control may rely on one or both of the upstream and downstream sensors, and may utilize the information from the upstream and downstream sensors differently and to different extents. Such feedback control provides for adjustment in the injected fuel to maintain the desired air-fuel ratio and operating state of the catalyst.

FIG. 3 is a flow chart illustrating a method 300 for correcting oxygen sensor output to account for calibration errors caused by aromatic hydrocarbons, for example. Method 300 may be carried out by the controller 12 as part of method 200, as indicated above.

Method 300 comprises, at 302, converting an upstream sensor reading, such as the sensor reading received at 202, to an air-fuel ratio via a look-up table. The look-up table may be stored in the memory of the controller 12, and may map an air-fuel ratio in the form of a lambda value based on the oxygen sensor reading. The lambda value from the table may further be corrected based on a sensor calibration correction value at 304. The sensor calibration correction value may be based on one or more of engine speed, engine load, engine temperature, and camshaft position, and further with or without an adaptation value. The determination of the adaptation value is based on engine operating conditions and further based on information from the downstream oxygen sensor, as described in more detail with respect to FIG. 4. At 306, method 300 comprises determining an upstream air-fuel ratio based on the converted sensor reading and sensor correction calibration value from the table. In this way, the sensor reading may be compensated to reduce the effects caused by aromatic hydrocarbons.

Method 300 comprises, at 308, mapping a downstream sensor reading, such as the sensor reading received at 204, to an air-fuel ratio via a look-up table. The look-up table may be stored in the memory of the controller 12, and may give an indication of richness or leanness based on the oxygen sensor reading via a stored switch point or switch point voltage range. The value from the table may further be based on, at 310, a correction value based on one or more of engine speed, engine load, engine temperature, and camshaft position (but without adaptation). At 312, the value from the table may be used to determine a downstream air-fuel ratio.

The upstream and downstream air-fuel ratios may be used to adjust the fuel injection amounts, as described above with respect to FIG. 2. In other embodiments, the upstream air-fuel ratio may be used to adjust the fuel injection amounts while the downstream air-fuel ratio may be used for other activities, such as determining catalyst efficiency, etc.

Turning to FIG. 4, a method 400 for adapting an upstream oxygen sensor reading is depicted. Method 400 may be carried out by the controller 12 as part of method 300, as indicated above.

Method 400 comprises, at 402, determining adaptation conditions. The adaptation conditions comprise engine temperature being below a threshold 404. Engine temperature may be determined from a signal received from an engine temperature sensor, as described with respect to FIG. 1. The threshold may be normal engine operating temperature, such as 300° F., or any suitable temperature in which increased exhaust constituents may be present. If the engine operating temperature is at or above normal operating temperature, it may be possible to actively cool the engine in order to perform the method described herein. To actively cool the engine, the radiator fan speed may be increased, the coolant flow may be increased, etc.

The adaptation conditions further include the activity of the catalyst coupled downstream of the oxygen sensor being above a threshold at 406. If the catalyst activity is above a threshold, constituents (such as aromatic hydrocarbons) present in the exhaust upstream of the catalyst will be oxidized or reduced in the catalyst, and as such an oxygen sensor downstream of the catalyst may be able to provide information free of the hydrocarbons that can be compared to the sensor reading from upstream of the catalyst (which is affected by such aromatic hydrocarbons), even though both sensors should be indicating the same reading if both sensors are sensing exhaust gas with the same oxygen content (or the same air-fuel ratio). Catalyst activity may be determined by catalyst temperature, emissions downstream of the catalyst, and/or feedback from the downstream oxygen sensor, or any suitable method. As the adaptation conditions include both engine operating temperature being below normal and an active catalyst, the catalyst may activated by a mechanism besides heat from the engine. For example, the catalyst may be activated by a heater coupled to the catalyst.

Steady engine operating conditions may facilitate use of the downstream oxygen sensor information to correct the upstream sensor by ensuring that both sensors are reading exhaust gas with substantially the same air-fuel ratio. That is, due to the time delay for the exhaust to travel past the upstream sensor, through the catalyst, and to the downstream sensor, taking readings when the engine conditions remain relatively static can provide improved learning of the upstream sensor calibration errors. When the engine is operating at steady-state conditions, an accelerator pedal or throttle position may be within a range of a rolling average at 408. Accelerator pedal position may be determined by a signal generated by a pedal position sensor, and throttle position may be determined by a throttle position sensor, both of which send a signal to the controller. Within a predetermined time period, such as ten seconds, thirty seconds, etc., or within a predetermined number of engine cycles, the controller may determine the average accelerator pedal or throttle position and store it in the controller memory. This average "rolls" with passing time intervals, for example the average is updated every second, or every engine cycle. The current pedal or throttle position is compared to the rolling average and determined if the current position is within a predetermined range of the rolling average. In this way, if the current position is outside the average, it is assumed the engine is operating under transient conditions, such as sudden acceleration.

At 410, method 400 comprises determining if the adaptation conditions described above are met. If the answer is no, method 400 proceeds to 416. If the answer is yes, method 400 proceeds to 412 to determine the adaptation value. In one embodiment, only when all adaptation conditions are met may the method 400 proceed from 410 to 412 to determine the adaptation value. In other embodiments, a combination of one or more of the adaptation conditions being met may be sufficient to allow method 400 to proceed to determine the adaptation value.

The adaptation value may be determined based on feedback from the downstream oxygen sensor. In this manner, error introduced to the upstream oxygen sensor by operating conditions specific to the vehicle, such as power-train and/or fuel variability, may be accounted for. To determine the adaptation value, a difference is determined between the output of the upstream and downstream oxygen sensors at 412. For example, the output of the downstream sensor may be subtracted from the output of the upstream sensor. The adaptation value may have a calibrated maximum and/or minimum in order to keep the error correction within a certain range. For example, if the adaptation value is above the calibrated maximum, it may indicate an error in one of the sensors, and as such correcting for the calculated error may be unwarranted, producing an unwanted change to the air-fuel ratio. Method 400 proceeds to 414 to update the look-up table based on the adaptation value. The look-up table, as described with respect to FIG. 3, provides a sensor calibration correction value based on engine speed, load, temperature, and cam position, which provides an estimation of any bias to the upstream sensor caused by exhaust gas constituents, for example. The look-up table may also be adapted based on the difference between the output of the upstream and downstream sensors, to provide adaptation of the estimated sensor calibration correction value based on the measured bias of the upstream sensor (as determined by the output of the downstream sensor). For example, under a given set of engine operating parameters (engine speed, load, etc.), the output of the oxygen sensor may be corrected by a sensor calibration correction value of 0.1. Additionally, the adaptation value determined at 412, based on a difference between the upstream and downstream oxygen sensors, may be 0.15. The look-up table may then be adapted at 414 using both of these values. In one embodiment, the output of the sensor may be corrected using the following equation:

$$[(V_A-V_T)(V_T)]+V_T=\text{sensor calibration correction value}$$

Where $V_A$ is the adaptation value determined at 412 and $V_T$ is the value from look-up table based on engine speed, load, cam position, and temperature. In the example described above, the sensor calibration correction value would be give by:

$$[(0.15-0.1)(0.1)]+0.1=0.105$$

The look-up table may be updated to provide 0.105 as the sensor calibration correction value under these operating parameters. Over time, as the engine is operated under the adaptation conditions, the look-up table may be adapted to provide more accurate, vehicle-specific sensor calibration correction values.

Method 400 proceeds to 416 to map the upstream sensor reading to the look-up table to provide a sensor calibration correction value. If the adaptation conditions were met at 410, the provided sensor calibration correction value will be based on the current adaptation, as well as any previous adaptations. If the adaptation conditions were not met at 410, the provided sensor calibration correction value will not be based on a current adaptation. However, if the look-up table was previously adapted, the provided sensor calibration correction value will reflect these past adaptations. If the vehicle has never been operated under the adaptation conditions, then the provided sensor calibration correction value may not be adapted. The sensor calibration correction value may then be added to the voltage output of the upstream sensor and used to determine the air-fuel ratio.

Thus, FIGS. 2-4 provide methods for adjusting a fuel injection amount based on an adjusted air-fuel ratio. The adjusted air-fuel ratio may be determined by the engine controller based on output from an exhaust system oxygen sensor positioned upstream of a catalyst. The sensor may be exposed to constituents in the exhaust, such as unburnt hydrocarbons, that cause errors in the accurate determination of the air-fuel ratio. These errors may be corrected based on engine speed, load, temperature, and camshaft position. To further account for errors that are vehicle specific, such fuel variabilities, the output of the upstream oxygen sensor may be adapted under certain engine operating conditions. These conditions include engine operating below a threshold temperature, the catalyst being in an active state, and steady state conditions as determined by accelerator pedal or throttle position. The adaptation value may be calculated by determining a difference between the upstream oxygen sensor output and the downstream oxygen sensor output. The look-up table may then be adapted based on the adaptation value to provide a more accurate, vehicle-specific sensor calibration correction value.

In some embodiments, the sensor calibration correction value, based on engine operating parameters and information from the downstream exhaust sensor, may be a value that is used to adjust the voltage output of the upstream exhaust sensor prior to determining the air-fuel ratio. In other embodiments, the air-fuel ratio may be determined by the controller based on the upstream exhaust sensor, and the determined air-fuel ratio adjusted by the sensor calibration correction value to generate a corrected air-fuel ratio reading from the sensor.

As will be appreciated by one of ordinary skill in the art, the methods described in FIGS. 2-4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for adjusting a fuel injection amount to one or more cylinders of an engine, comprising:

operating the engine in steady-state conditions with engine temperature below a threshold while catalyst activity is above a threshold, responsive to operating the engine in the steady-state conditions with the engine temperature below the threshold while the catalyst activity is above the threshold, determining a calibration error of a first oxygen sensor within an exhaust system of the engine based on information from a second oxygen sensor within the exhaust system, the first oxygen sensor positioned upstream of a catalyst, and the second oxygen sensor positioned downstream of the catalyst, where both sensors measure exhaust gas with a same actual air-fuel ratio;

adjusting a determined air-fuel ratio based on the calibration error; and adjusting the fuel injection amount to the one or more cylinders based on the adjusted air-fuel ratio.

2. The method of claim 1, wherein determining the calibration error further comprises subtracting a switch point of the second oxygen sensor from a voltage output of the first oxygen sensor.

3. The method of claim 1, wherein determining the calibration error further comprises determining the calibration error in response to an accelerator and/or throttle position being within a predetermined range of a rolling average.

4. The method of claim 1, wherein calculating the air-fuel ratio further comprises calculating the air-fuel ratio based on the calibration error and one or more of engine speed, engine load, engine temperature, and a position of a camshaft.

5. The method of claim 1, wherein determining the calibration error further comprises determining the calibration error in response to the catalyst being active.

6. A system for controlling air-fuel ratio of an engine, comprising:

a fuel injection system configured to deliver fuel to one or more cylinders of the engine;

an exhaust system coupled to the one or more cylinders;

a catalyst coupled to the exhaust system;

a first oxygen sensor coupled upstream of the catalyst;

a second oxygen sensor coupled downstream of the catalyst; and a control system including a computer readable storage medium, the medium including non-transitory instructions thereon, the control system receiving communication from the first and second exhaust gas oxygen sensors, the medium comprising instructions for:

responsive to selected engine operating conditions, determining a sensor calibration correction value and adjusting an air-fuel ratio based on the sensor calibration correction value, where the sensor calibration correction value is determined based on a difference between an output of the first oxygen sensor and an output of the second oxygen sensor, the outputs concurrently read from the respective sensors; and adjusting a fuel injection amount to the one or more cylinders in response to the adjusted air-fuel ratio, wherein the selected engine operating conditions comprise the catalyst being in an active state while the engine is operating at a temperature below a threshold temperature.

7. The system of claim 6, wherein the threshold temperature is a normal engine operating temperature.

8. The system of claim 6, wherein the selected operating conditions further comprise an accelerator and/or throttle position being within a predetermined range of a rolling average.

9. The system of claim 6, wherein the sensor calibration correction value further comprises subtracting a switch point of the second oxygen sensor from a voltage output of the first oxygen sensor.

10. The system of claim 6, wherein adjusting the air-fuel ratio further comprises adjusting the air-fuel ratio based on one or more of engine speed, engine load, engine temperature, and a position of one or more camshafts of the engine.

11. The system of claim 6, wherein the first oxygen sensor comprises a wideband sensor and the second oxygen sensor comprises a narrowband sensor.

* * * * *